United States Patent [19]

Dalmasso

[11] 3,999,053
[45] Dec. 21, 1976

[54] INTERFACE FOR CONNECTING A DATA-PROCESSING UNIT TO AN AUTOMATIC DIAGNOSIS SYSTEM

[75] Inventor: Ginette Laure Dalmasso, Bagnolet, France

[73] Assignee: Compagnie Honeywell Bull (Societe Anonyme), Paris, France

[22] Filed: Apr. 30, 1975

[21] Appl. No.: 573,385

[30] Foreign Application Priority Data

May 8, 1974 France .................... 74.15945

[52] U.S. Cl. .................. 235/153 A; 235/153 AC; 235/153 AK; 340/172.5
[51] Int. Cl.² ............ G06F 11/04; G06F 11/10
[58] Field of Search ... 235/153 A, 153 AC, 153 AK; 340/172.5

[56] References Cited

UNITED STATES PATENTS

| 3,585,599 | 6/1971 | Hitt et al. | 340/172.5 |
| 3,909,802 | 9/1975 | Cassarino et al. | 340/172.5 |

Primary Examiner—R. Stephen Dildine, Jr.
Attorney, Agent, or Firm—Lowe, King, Price & Markva

[57] ABSTRACT

The disclosure describes an interface including data lines and address lines which address a memory. Control lines control the exchanges of data among the data lines, address lines, memory and data processing unit. A parity line provides a means of checking the accuracy of the information transmitted on the data or address lines.

15 Claims, 5 Drawing Figures

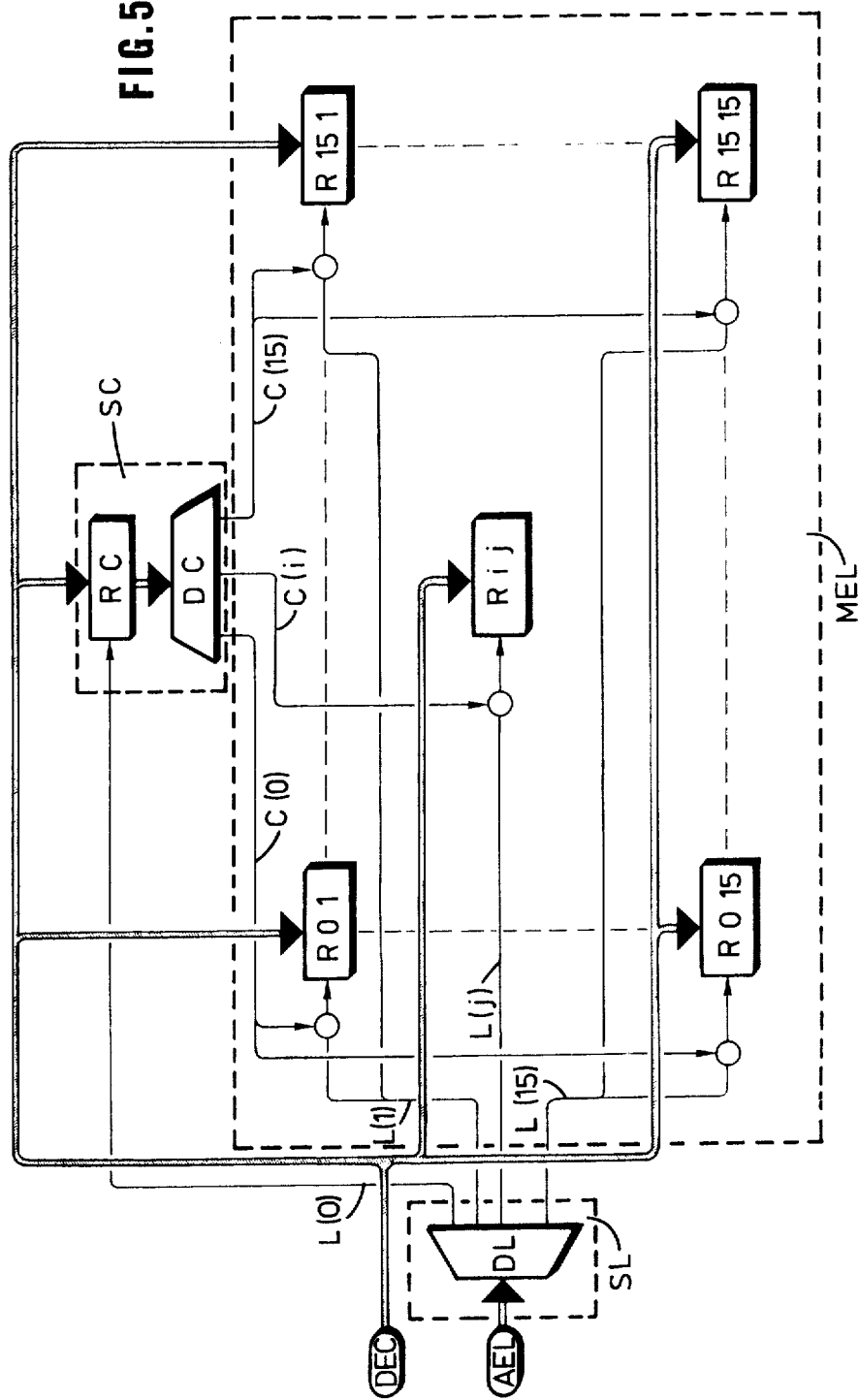

INTERFACE FOR CONNECTING A DATA-PROCESSING UNIT TO AN AUTOMATIC DIAGNOSIS SYSTEM

BACKGROUND AND SUMMARY OF THE INVENTION

The present invention relates to an interface for connecting a data-processing unit to an automatic diagnosis system, and more particularly to means for controlling and implementing such an interface.

The circuits of data-processing units are normally complex. In the event of faults in such units, a diagnosis performed by manual or semi-automatic means is lengthy and laborious, and, therefore, reliance has increasingly been placed on automatic methods of testing and diagnosis. In the main, these automatic methods consist of carrying out in a computer special programs for diagnosing the unit to be investigated. When these programs are carried out, test data is fed into the unit concerned via an interface which connects it to the diagnosis computer system, and the data resulting from the test is transmitted by the unit to this system, generally via the same interface. Among the data which is transmitted by the unit being tested to the diagnosis system, those items which represent fault symptoms are identified from the addresses (contained in the program being carried out) of the parts of the unit into which the test data was written in the first place. The interface via which the unit to be diagnosed is connected to the diagnosis system contains signal transmission lines which are combined into channels. The signals transmitted along these lines represent on the one hand the information exchanged between the system and the unit to be diagnosed and on the other hand the commands by which these exchanges are made.

Since a unit being diagnosed does not generally operate synchronously with the diagnosis system connected to it, adapting means are required to set up dialogues between the unit and the system along the said transmission lines. In known diagnosis systems, the adapters are so designed that the dialogues are carried on by means of a maintenance panel or console through which signals giving the status of the unit being tested pass before they are transmitted via the adapter and lines to the external diagnosis system. In particular, such adapting means allow a unit to be tested and diagnosed only when it is not operating, and it is possible that the location of a fault in the unit may be delayed or even falsified by the further sources of error which result from inserting circuits between the unit proper and the diagnosis system.

Interfaces have also been developed to allow data to be exchanged between the diagnosis system and the unit to be diagnosed by means of a limited number of connecting channels. Such interfaces include means for generating signals for controlling the exchange of data on the lines. These means are divided among the input-/output circuits of the system and the unit. Such additional circuits contained in the unit may become an additional source of error which delays the process of finding the fault in the unit concerned.

One of the objects of the present invention is to enable a data-processing unit to be diagnosed quickly when operating.

Another object of the invention is to provide reliable diagnosis of a data-processing unit by means of a minimum of test circuits.

In accordance with a principal feature of the invention, the interface for connecting a data-processing unit to an automatic diagnosis system includes a set of signal transmission lines which are connected to the unit and to the system so as to allow the system to diagnose the unit. The diagnosis is achieved by a succession of operations involving writing data into, and reading data out of, the unit and by processing this data character-by-character. In accordance with the invention, such an interface includes a set of lines comprising:

a first group of lines for the bidirectional transmission, character-by-character, of the data to be written into, or read out of, the unit by the system, the first group comprising lines equal in number to the bits which form one data character;

a second group of lines for successive unidirectional transmission from the system of the addresses at which the data transmitted by the first group of lines is read by the system into or out of the unit, the second group comprising lines equal in number to the bits forming one address character;

a third group of lines for controlling the exchanges of information carried out along the first and second groups of lines, the third group comprising:
  a. a bidirectional parity line for transmitting parity signals associated with the address and data characters transmitted by the first and second groups of lines,
  b. a sub-group of unidirectional lines for transmitting, from the system, signals for controlling the exchanges of information carried out along the parity line and the first and second groups of lines, and
  c. a unidirectional event line for transmitting signals from the unit to report asynchronous events occurring in the unit.

DESCRIPTION OF THE DRAWINGS

Other advantages and features of the preferred form of the invention will become apparent from the following description, which is given as a non-limiting example, and with reference to the accompanying drawings, in which:

FIG. 5 is a schematic, block diagram showing an embodiment of a temporary storage circuit (including its addressing circuit) into which and from which an automatic diagnosis system writes and reads the data which is exchanged with a processing unit via a connecting interface according to the invention.

DESCRIPTION OF THE PREFERRED EMBODIMENT

Figure 1:
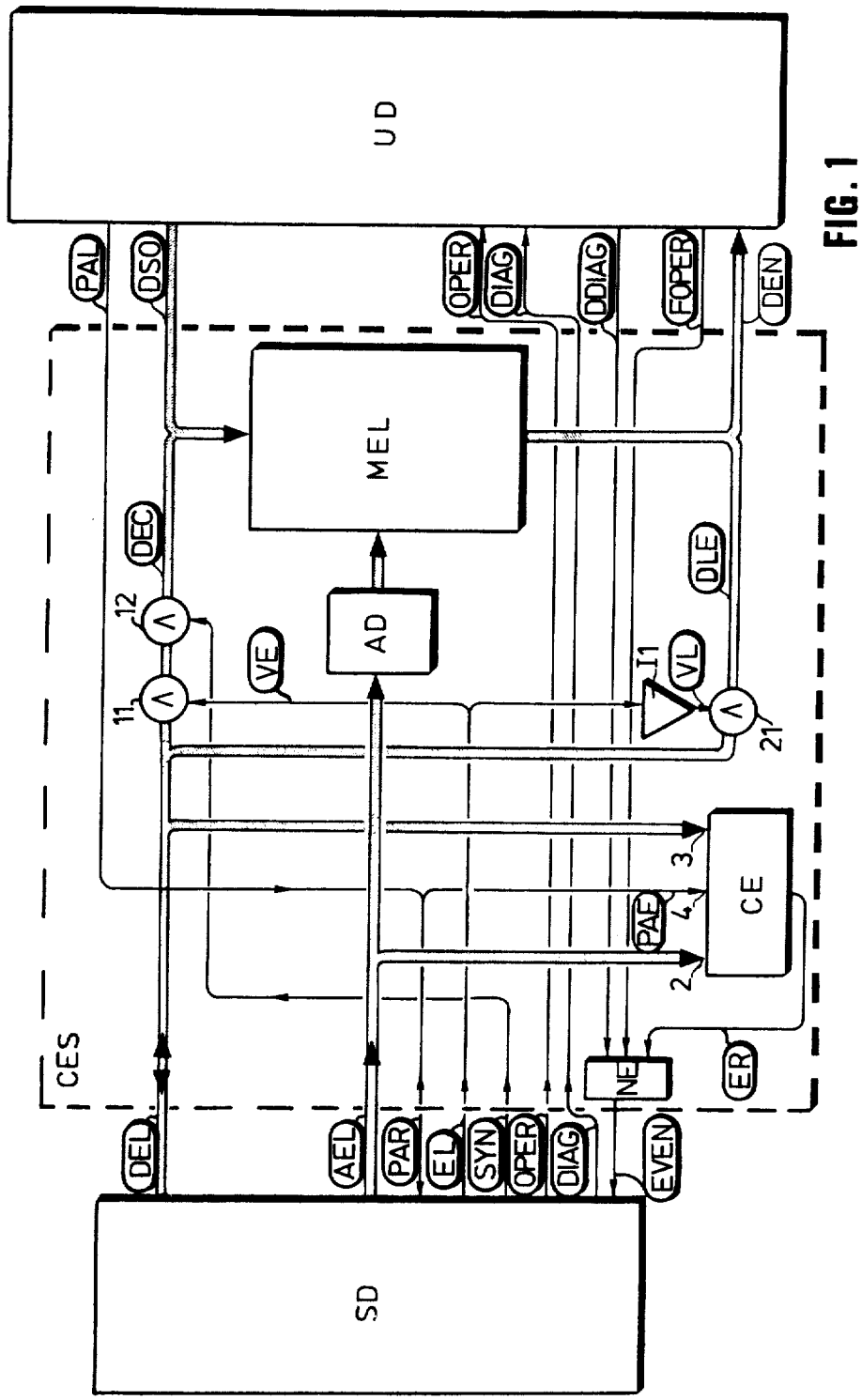
FIG. 1 is a schematic block diagram showing the principle of a preferred interface according to the invention for connecting a data-processing unit to an automatic diagnosis system.

Referring to FIG. 1, a preferred form of interface according to the invention includes a group of data lines (DEL), a group of address lines (AEL), a parity line (PAR), a read/write line (EL), a sync line (SYN), an operation line (OPER), a diagnostic line (DIAG), an event line (EVEN), and an input/output circuit CES for the signals transmitted by all these lines. Circuit CES is contained in a unit which also includes data-processing means UD. UD is connected to circuits CES so as to receive and transmit to them the data which is to be exchanged with an automatic diagnosis system SD.

Circuit CES includes a memory circuit MEL for the temporary storage of the data transmitted by data lines (DEL). The data is written into MEL via paths (DEC) and is read out of MEL via paths (DLE). Data is read or written along paths (DLE) and (DEC), respectively, in accordance with the nature of the signal which is transmitted by read/write line (EL). The signal on line (EL) either validates a write operation by means of a signal VE or validates a read operation by means of a signal VL.

Memory circuit MEL includes a set of memory elements not shown in FIG. 1, which are individually selected by an addressing circuit AD. The outputs of circuit AD are connected to circuit MEL and the inputs of circuit AD are connected to the group of lines (AEL). In this way, each memory element in circuit MEL may have written into or read out of it a unit of data (or bit) in the course of an operation which is validated by signal VE or VL. Circuit AD selects the proper element as a result of receiving the appropriate address from lines (AEL).

In data-processing systems, the various circuits through which data flows are equipped with monitors which check whether the data has changed in the course of processing. These checks are generally made by monitors which check parity (or imparity) codes. A parity (or imparity) code is associated with each combination of bits representing an item of data to be transferred from one circuit to another. In FIG. 1, parity line (PAR) allows the transfer of each parity (or imparity) code signal associated with an address or data character which is transmitted along lines (AEL) or (DEL). The parity (or imparity) code signals for each data item read out are transmitted via path (PAL) onto line (PAR), while those for each address and data item written are received from line (PAR) by path (PAE).

Data received from lines (DEL) is written into circuit MEL via paths (DEC) each time a signal received along sync line (SYN) appears. Data received along lines (DEL) is written into circuit MEL by means of two transfer circuits 11 and 12 which are actuated by the high states of the signals received along lines (EL) and (SYN), respectively. Circuits 11 and 12, are, for example, formed by AND gates which allow signals on paths (DEC) to pass when there are present respectively, a signal VE and the high state of a signal received along line (SYN). Data transmitted along lines (DLE) by circuit MEL is read out by means of transfer circuit 21, which is actuated by the low state of the signal which is received along line (EL). Circuit 21 is, for example, formed by an AND gate which allows signals on paths (DLE) to pass when a signal VL is present. The reception by circuits 11 and 12 of the high states of the signals transmitted along lines (EL) and (SYN) and the reception by circuit 21 of the low state of signal (EL) are made possible by an inverter 11 which is situated between line (EL) and circuit 21.

Using the parity (or imparity) code signals which are transmitted along path (PAE), the addresses and data which are transmitted along lines (AEL) and (DEL) during a write operation are checked in a checking circuit CE which is connected by its inputs, 2, 3, 4 to lines (AEL), (DEL) and (PAR), respectively. When a data or address character is wrong, circuit CE gives an error signal ER at its output.

Circuit CES also includes a logic circuit NE for reporting asynchronous events which occur in processing unit UD. In the event of an error being detected by checking circuit CE in the course of a write operation, logic circuit NE, the output of which is connected to line (EVEN), reports the error to the diagnosis system SD by means of an asynchronous event signal.

Each signal which reaches the processing members UD of the unit via line (DIAG) allows this unit to connect itself to system SD via the interface which forms the subject of the present invention and via its own means. Connecting the unit to system SD automatically puts the unit into the diagnosis mode and, to indicate to the system that it has gone over to this mode, a mode signal is transmitted along a path (DDIAG) which is connected to a second input of circuit NE. The mode signal allows circuit NE to transmit a signal along line (EVEN).

If the unit has gone into the diagnosis mode as a result of receiving a signal along line (DIAG), system SD tells the unit what operations are to be performed by means of data which was recorded in circuit MEL during the write operations. Once all the instructions to be carried out have been assembled, at the conclusion of at least one write operation, the unit receives an order to carry out these instructions in the form of a signal which is transmitted by system SD along line (OPER) and is passed on to processing members UD by circuit CES. When the instructions given by the system have been carried out by the unit, the unit indicates this completion by means of a finish signal which is transmitted along a path (FOPER). (FOPER) is connected to a third input of circuit NE. The finish signal allows circuit NE to emit a signal along line (EVEN). All the data exchanged between system SD and members UD of the unit is written into or read out of the members UD via paths (DEN) and (DSO) respectively which are located between circuit MEL and members UD of the unit.

Figure 2:
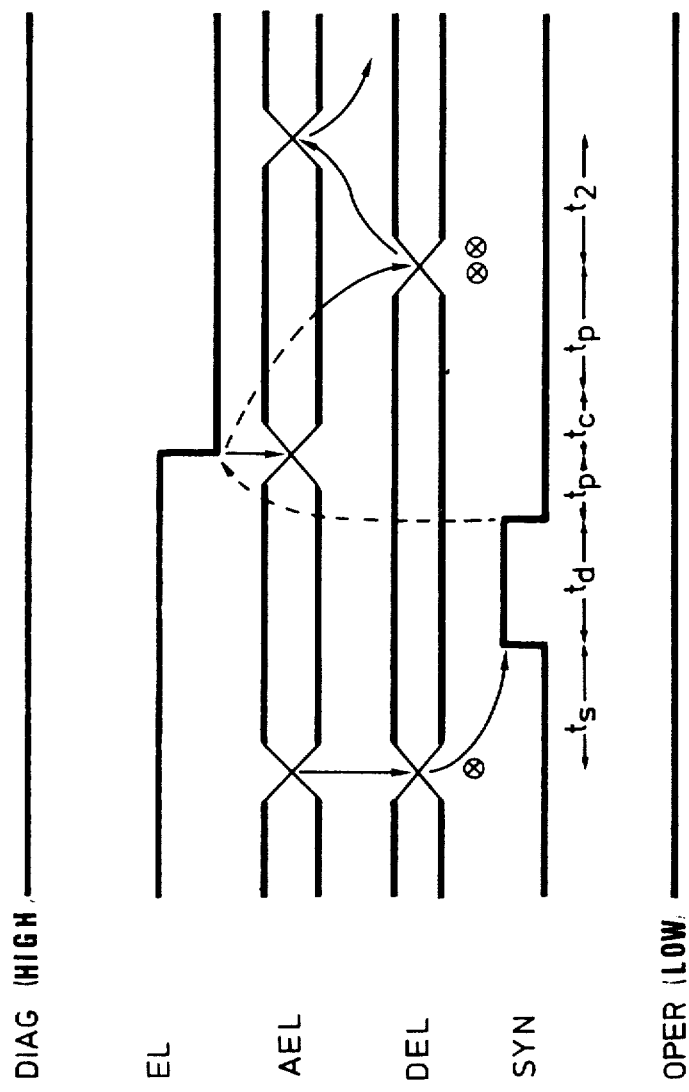
FIG. 2 is an overall time-chart for the signals transmitted in accordance with the invention by means of which an automatic diagnosis system performs the operations of writing into or reading out of a processing unit.

When a unit (such as that whose processing members UD are shown in FIG. 1) has gone into the diagnosis mode following the transmission of the high state of a signal along line (DIAG), the operations of writing data into or reading out of this unit are brought about by the signals shown in FIG. 2. When the high state of a signal is transmitted along line (EL), the signals for addressing the elements of circuit MEL (FIG. 1) into which data is to be written, together with the signals representing the data which is to be written into these elements, are transmitted by the diagnosis system along lines (AEL) and (DEL) respectively. After a delay $ts$, the diagnosis system emits a signal of length $td$ along line (SYN). At a time $tp$ after the signal transmitted along line (SYN) has gone to its low state, a low state signal is transmitted along line (EL), while a fresh transmission takes place along lines (AEL) to bring about a read operation. Within a time $tc$ after the change of level of the signal transmitted along line (EL), the unit emits signals onto lines (DEL) and a parity signal is transmitted by the unit onto line (PAR). Within a time $tp$ after this latter transmission, the system reads lines (DEL) and (PAR). After the time $t2$ which the system requires to perform this reading operation, it may, for example, change the state of the signal which is being transmitted along line (EL) so as to perform a fresh write operation.

Figure 3:
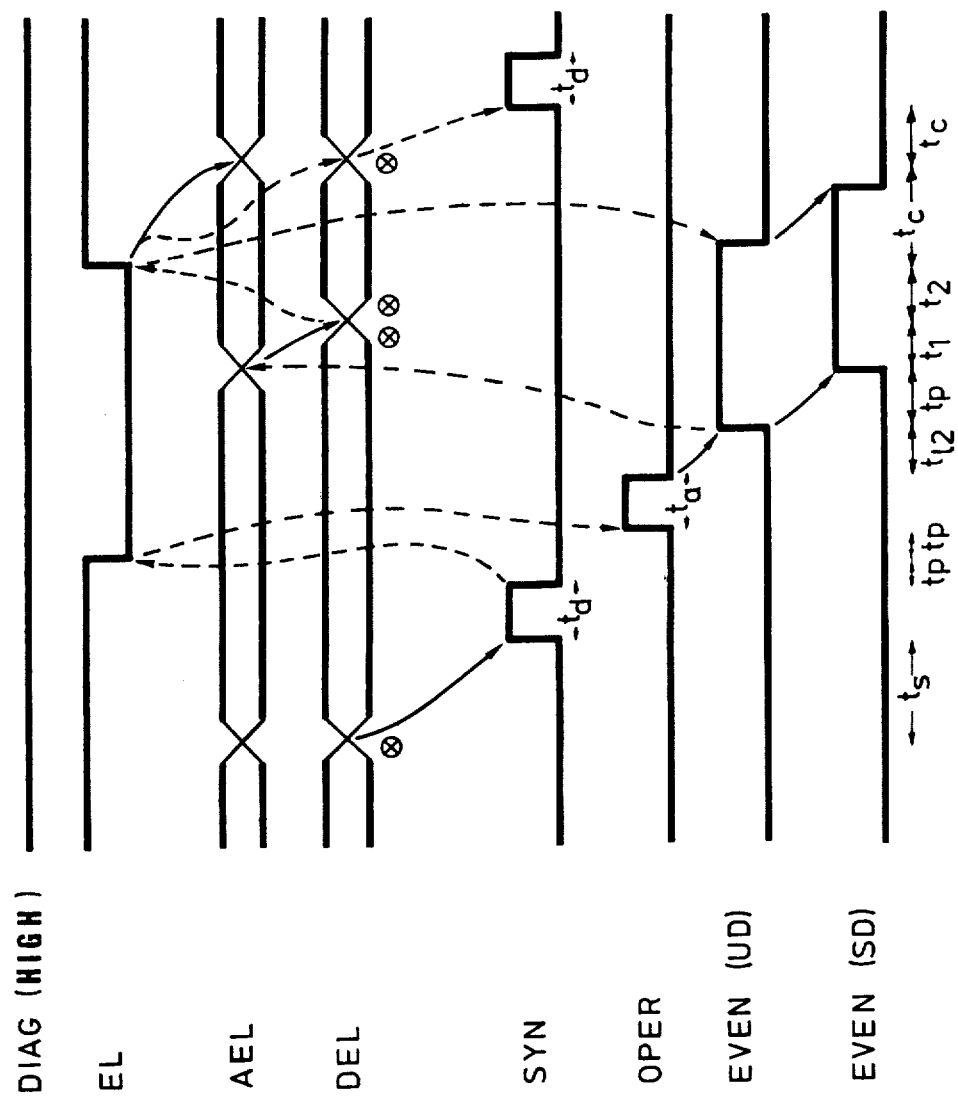
FIG. 3 is a special time-chart for the signals transmitted in accordance with the invention by means of which an automatic diagnosis system performs the operations of writing data into and reading data out of a processing unit.

FIG. 3 illustrates the signals which the diagnosis system uses to perform read and write operations when an order to carry out an operation is given by diagnosis system SD to unit UD. After a write operation has been carried out by means of signals such as those shown in FIG. 2, the data recorded in circuit MEL (FIG. 1) includes the instructions by means of which the unit will be able to carry out the operation. Within a time $tp$ after the signal transmitted along line (EL) (by means of which the diagnosis system is able to perform a read operation) has gone up to a low state, a signal of length $ta$ is transmitted by the system along line (OPER) to order the unit to carry out the operation previously written into circuit MEL. After the operation has been carried out by the unit, its conclusion is reported by the unit after a time $tL2$ at the end of which a signal is transmitted along line (EVEN). The signal transmitted along line (EVEN) is received by the diagnosis system a time $tp$ after it is transmitted by the unit. Within a time $t1$ after the signal on line (EVEN) has been received, the system reads lines (DEL) and (PAR) during a period $t2$. At the end of period $t2$, a new write operation may be carried out by setting the signal transmitted along line (EL) to its high state.

Figure 4:
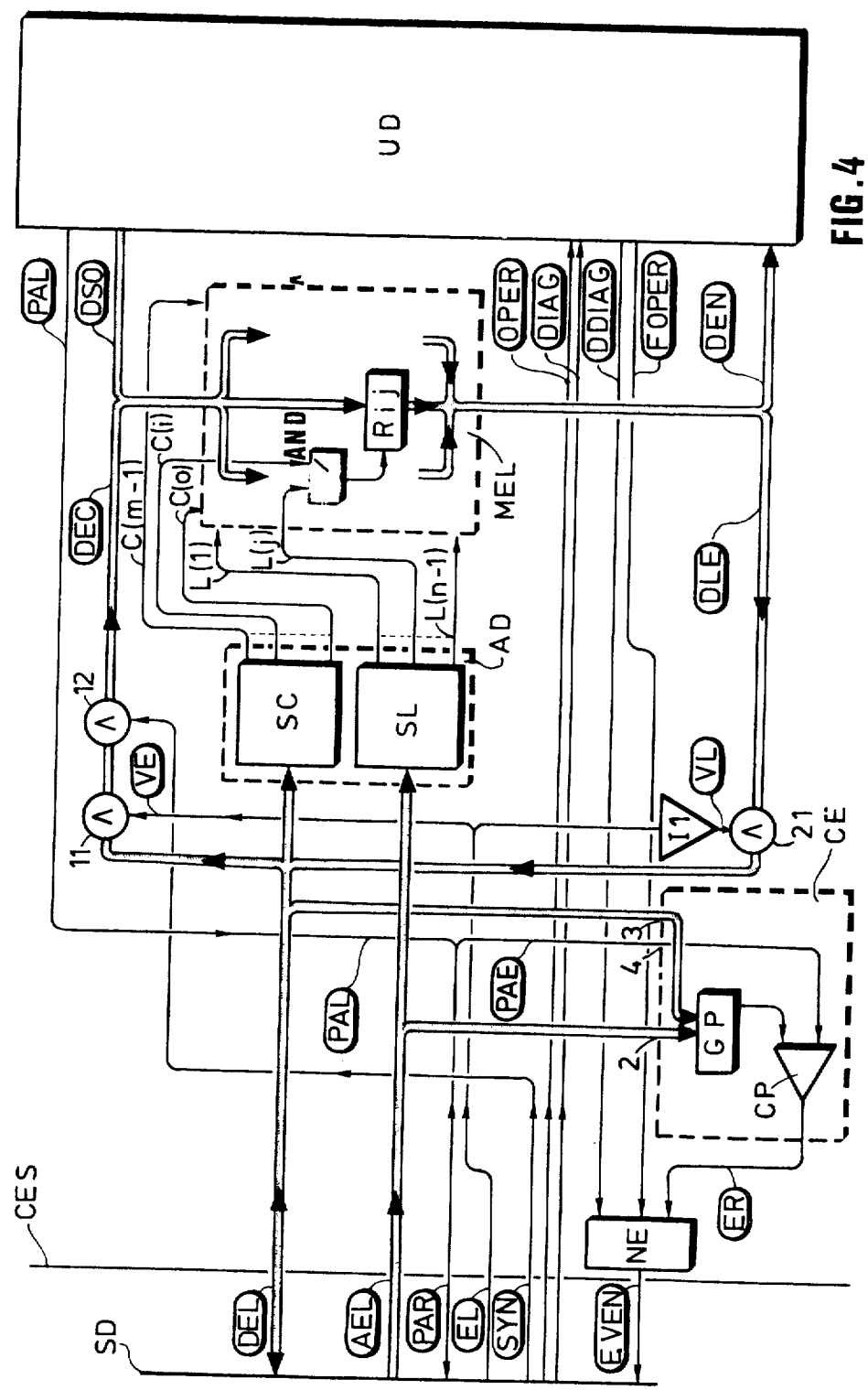
FIG. 4 is a schematic, block diagram of an embodiment of a connecting interface by which the signals in FIG. 3 are exchanged between a data-processing unit and a diagnosis system.

An embodiment of circuit CES from FIG. 1 is shown in FIG. 4. Only one memory element $Rij$ of circuit MEL is shown in FIG. 4. Circuit MEL actually consists of a set of memory elements identical to element $Rij$ which are arranged in $n-1$ rows $1, 2, \ldots j \ldots n-1$ and $m$ columns $0, 1, \ldots i, \ldots m-1$, memory element $Rij$ being situated in row $j$ and column $i$. Circuit AD enables individual memory elements to be selected. AD contains a row selector circuit which is connected by respective inputs to lines (AEL) and by respective outputs to rows $1, \ldots j, \ldots n-1$ of the elements contained in circuit MEL. Circuit AD also includes a column selector circuit which is connected by respective inputs to lines (DEL) and by respective outputs to columns O, $\ldots i, \ldots m-1$, of the elements contained in circuit MEL. Thus, as a result of a given address being transmitted by lines (AEL) to circuit SL, a signal is emitted from one output of circuit AD which is connected to row $j$ by path $L(j)$. As a result of a given item of data being transmitted by lines (DEL) to circuit SC, a signal is emitted from another output of circuit AD which is connected to column $i$ by path $C(i)$. Element $Rij$ is selected by means of an AND gate which is contained in circuit MEL and is associated with the element contained in circuit MEL and is associated with the element concerned. The two inputs of the AND gate are connected to outputs of circuit AD by paths $L(j)$ and $C(i)$ respectively.

Monitor or checking circuit CE in FIG. 4 consists of a parity code generator GP and of a comparator CP whose output is connected to one input of the asynchronous event reporting circuit NE. Generator GP is connected by its inputs 2 and 3 to lines (AEL) and (DEL) respectively and by its output to comparator CP. CP is connected by another input to line (PAR) along path (PAE). In this way the parity codes generated by each address and data item transmitted along lines (AEL) and (DEL) are compared with those which are transmitted along the line (PAR). The codes transmitted along line PAR are the codes ordinarily associated with the address and the data items transmitted over lines (AEL) and (DEL). If the codes differ, a parity error signal is sent to circuit NE to indicate that an error has occurred in the course of the write operation.

In FIG. 5, circuit SL of circuit AD (FIGS. 1 and 4) has 15 outputs, which are connected to 15 rows of elements in circuit MEL by 15 respective paths $L(1)$, $L(j)$, $L(15)$, and a further output which is connected to circuit SC in circuit AD. Circuit SC (FIG. 5) has 16 outputs which are connected to 16 columns of elements in circuit MEL by 16 respective paths $C(0)$, $C(i), \ldots C(15)$. The memory elements of circuit MEL, which are arranged in 16 columns and 15 rows, are registers. Each register is composed of four flip-flops. The inputs of the flip-flops are connected to lines (DEL) by paths (DEC) (the only ones shown in FIG. 5), the outputs of the flip-flops are connected to lines (DEL) by paths (DLE) (FIG. 1). Register Ro1 is connected (by an associated AND gate represented by a circle) to paths $L(1)$ and $C(0)$; register R151 is connected (by an associated AND gate represented as a circle) to paths $L(1)$ and $C(15)$; register R015 is connected (by an associated AND gate represented as a circle) to paths $L(15)$ and $C(0)$; register R1515 is connected (by an associated AND gate represented as a circle) to paths $L(15)$ and $C(15)$. The circuit SL for selecting rows in circuit AD (FIGS. 1 and 4) is formed by a decoder DL which has four inputs that are connected to respective ones of four lines (AEL) (in the embodiment of the invention shown in FIG. 5), and 16 outputs which are connected, respectively, to circuit SC by path $L(0)$ and to various rows of registers in circuit MEL by paths $L(1), L(j) \ldots L(15)$. According to which one of the sixteen binary combinations is received by decoder DL at its inputs, a signal is transmitted along one of the paths $L(0), L(1), \ldots L(15)$ to select either circuit SC or one of the rows of registers. The circuit SC for selecting columns in circuit AD (FIGS. 1 and 4) is formed, in FIG. 5, by a register RC made up of four flip-flops which are connected by their respective inputs to lines (DEL) and by their respective outputs to four inputs of a decoder DC which is likewise contained in circuit SC. Circuit SC is able to be selected by decoder DL as a result of path $L(0)$ being connected to another input of register RC. Decoder DC of circuit SC has 16 outputs which are connected to the various columns of registers in circuit MEL by paths $C(0), C(i), \ldots C(15)$ respectively. Depending on which one of the 16 binary combinations is stored in register RC (selected by path $L(0)$, this combination, when decoded by decoder DC, gives a signal along one of the paths $C(0), C(i), \ldots C(15)$ so as to select one of the columns of registers.

In the embodiment of circuits AD and MEL shown in FIG. 5, the interface according to the invention consists of a set of 14 lines which are combined into a single standard cable. Such an embodiment is particularly advantageous from the point of view of the manufacturing cost of a piece of diagnosis equipment associated with a data-processing unit. The number of components in circuit CES is reduced to the minimum due to he applicants' unique design by which the handling of dialogues is almost entirely the responsibility of the diagnosis system. Because of the simplicity of the design, it is possible to avoid introducing additional errors which are difficult to detect into the unit. Because of the advantageous design of the addressing circuit AD, the number of registers in circuit MEL can be sufficiently large to allow simulation of all the functions normally performed by the switches, push-buttons and selectors on a maintenance panel.

The present invention can be used in connection with any conventional processing unit UD, such as the processing units found in the Honeywell Series 60, Level 54, Model 20 or the IBM 360, Model 25. Of course, these processors must be modified to generate and accept the control signals described herein. This modification can be achieved by the use of conventional logic circuits. The design of these circuits is well within the skill of the art.

The present invention can be used in connection with many conventional diagnostic systems SD capable of generating test signals. The generation of such test signals is described in U.S. Pat. Nos. 3,383,260; 3,497,685 and 3,815,103. Suitable comparison techniques for locating errors in computer functional units are described in U.S. Pat. Nos. 3,343,141; 3,603,936 and 3,405,258.

What is claimed is:

1. An interface connected between a data-processing unit and an automatic diagnosis system for enabling the system to diagnose the unit by a succession of operations involving writing data into and reading data out of the unit and by processing the data character-by-character, said interface including a set of lines comprising:
   data line means for the bidirectional, character-by-character transmission of the data to be written into or read out of the unit by the system, said data line means comprising a first group of lines equal in number to the bits which form one data character;
   address line means for the successive unidirectional transmission from the system of the addresses at which the data transmitted by the data line means is read by the system into or out of the unit, said address line means comprising a second group of lines equal in number to the bits which form one address character; and
   control line means for controlling the exchanges of information carried out by the data line means and the address line means, said control line means comprising:
      a bidirectional parity line for transmitting parity signals associated with the address and data characters transmitted by the data line means and the address line means,
      a sub-group of unidirectional exchange control lines for transmitting from the system signals for controlling the exchanges of information carried out on the data line means, address line means and parity line, and
      a unidirectional event line for transmitting signals from the unit to report asynchronous events occurring in the unit.

2. An interface according to claim 1, wherein the exchange control lines comprise:
   diagnostic line means for transmitting from the system signals for enabling a diagnostic mode in which the unit is diagnosed by means of exchanges of information through the said interface;
   read/write line means for transmitting from the system signals for allowing data to be written into or read out of the unit along the data line means;
   sync line means for transmitting from the system for a predetermined length of time signals for validating writing into the unit along the data line means and parity line; and
   operation line means for transmitting from the system signals for validating the execution of operations to be carried out by the unit, said operations being determined by the data written into the unit along the data line means.

3. An interface according to claim 2, and further comprising a set of circuits contained in the unit and enabled by each signal transmitted along the diagnostic line means to transmit and receive the signals transmitted by said data line means, address line means and control line means, said set of circuits comprising:
   memory means including a set of memory elements connected by their inputs and outputs to the data line means for temporarily storing the data which is exchanged between the unit and the system during the read and write operations;
   addressing means connected to the address line means and to the memory elements of the memory means for reading and writing data into or out of the unit at the addresses of the memory means specified by the signals transmitted on the address line means;
   gating means connected to the read/write line and the sync line for transferring data along the data line means;
   checking means connected to the parity line for checking write operations by the data line means and the address line means; and
   a logic circuit connected to the checking means for generating the signals transmitted along the event line.

4. An interface according to claim 3, wherein the elements of the memory means comprise registers arranged in rows and columns, each register comprising bistable members equal in number to the number of said data line means to which the register is connected.

5. An interface according to claim 4, wherein the addressing means comprises:
   a row selector having inputs connected to the address line means and outputs connected to the rows of registers in the memory means; and
   a column selector having inputs connected to the data line means and outputs connected to the columns of registers in the memory means.

6. An interface according to claim 5, wherein the row selector includes a first decoder having outputs connected to respective rows of registers in the memory means, one of said rows being selected by a signal which is transmitted from one of the said decoder outputs as a result of a corresponding address transmitted along the address line means and decoded in the first decoder.

7. An interface according to claim 6, wherein the column selector comprises:
   a selection register including bistable elements equal in number to the number of said data line means to which the selection register is connected; and
   a second decoder having inputs connected to the outputs of the selection register and having outputs connected to the columns of registers in the memory means.

8. An interface according to claim 7, wherein the first decoder includes an output connected to the selection register for selecting the selection register as a result of a corresponding address transmitted along the address line means being decoded, said decoded address being first transmitted by the address line means to allow a first data item to be written into the selection register and to select a column of registers in the memory means as a result of the first data item being decoded by the second decoder, a second address being then transmitted by the address line means to select a row of registers in the memory means as a result of the second address being decoded by the first decoder, the register in the memory means common both to the column and the row being selected by the addressing means for the reading or writing of data over the data line means.

9. An interface according to claim 3, wherein the gating means comprises two AND gates connected among the data line means, the inputs to the memory means, the read/write line and the sync line, whereby the writing of data into the memory means is validated as a result of each high signal state transmitted by the read/write line at the same time that a high signal state is transmitted by the sync line.

10. An interface according to claim 3, wherein the gating means comprises an AND gate having an output connected to the data line means, a first input connected to the outputs of the memory means, and a second input connected to the read/write line through an inverter, whereby the reading of data out of the memory means is validated each time a low signal state is transmitted by the read/write line.

11. An interface according to claim 3, wherein the checking means comprises:

a parity signal generator having inputs connected to the data line means and address line means; and comparator means having respective inputs connected to the output of said parity signal generator and to the parity line for producing an output when the parity signal produced by the parity signal generator is different from the signal received on the parity line.

12. An interface according to claim 11, wherein the logic circuit comprises an OR gate having one input connected to the comparator means and having an output connected to the event line in order to transmit write error signals along the event line.

13. An interface according to claim 3, wherein the unit further comprises an operating means for receiving each signal transmitted along the diagnostic line and for emitting in response a mode signal indicating that the unit has gone into a diagnosis mode, and wherein the logic circuit is connected by one input to the operating means for receiving each mode signal and for emitting from its output a corresponding asynchronous event signal whenever the unit goes into the diagnosis mode.

14. An interface according to claim 3, wherein the unit further comprises an operating means for receiving each signal transmitted by the operation line and for emitting in response a finish signal for indicating that the unit has finished carrying out the operations which are validated by the signal transmitted along the operation line, and wherein the logic circuit is connected by one input to the operating means so as to receive each finish signal and to emit from its output a corresponding asynchronous event signal each time the unit completes such operations.

15. An interface according to claim 1, wherein the data line means and the address line means each comprise four lines.

* * * * *